United States Patent
Brand et al.

(10) Patent No.: US 12,359,872 B2
(45) Date of Patent: Jul. 15, 2025

(54) FURNACE, FLUID FEED COMPONENT, FLUID REFORMING SYSTEM AND METHOD OF REFORMING A FLUID

(71) Applicant: BURNSTAR TECHNOLOGIES (PTY) LTD, Mpumalanga (ZA)

(72) Inventors: Johan Francois Brand, Pretoria (ZA); Bernard De Waal Esterhuyse, Pretoria (ZA)

(73) Assignee: BURNSTAR TECHNOLOGIES (PTY) LTD, Mpumalanga (ZA)

( * ) Notice: Subject to any disclaimer, the term of this patent is extended or adjusted under 35 U.S.C. 154(b) by 544 days.

(21) Appl. No.: 17/761,499

(22) PCT Filed: Sep. 18, 2020

(86) PCT No.: PCT/IB2020/058714
§ 371 (c)(1),
(2) Date: Mar. 17, 2022

(87) PCT Pub. No.: WO2021/053602
PCT Pub. Date: Mar. 25, 2021

(65) Prior Publication Data
US 2022/0364791 A1 Nov. 17, 2022

(30) Foreign Application Priority Data
Sep. 19, 2019 (ZA) .................. 2019/06187

(51) Int. Cl.
*F27D 3/16* (2006.01)
*C22B 9/02* (2006.01)
*F27D 3/15* (2006.01)

(52) U.S. Cl.
CPC .............. *F27D 3/1563* (2013.01); *C22B 9/02* (2013.01); *C22B 9/023* (2013.01); *F27D 3/16* (2013.01); *F27D 2003/166* (2013.01)

(58) Field of Classification Search
None
See application file for complete search history.

(56) References Cited

U.S. PATENT DOCUMENTS 4,457,777 A * 7/1984 MacGregor ............... C21C 5/35
266/212
5,251,879 A 10/1993 Floyd
(Continued)

FOREIGN PATENT DOCUMENTS

EP 0 845 645 A2 6/1998
RU 2003711 C1 11/1993
(Continued)

OTHER PUBLICATIONS

European Office Action issued on Sep. 20, 2022, in related European application No. 20865394.9.
(Continued)

*Primary Examiner* — George Wyszomierski
(74) *Attorney, Agent, or Firm* — Womble Bond Dickinson (US) LLP

(57) ABSTRACT

There is disclosed a furnace (10), a fluid feed component, a fluid reforming system, and a method of reforming a fluid (20). The furnace (10) comprises a vessel (12) that defines a chamber (14) for holding a body of liquid (16). A fluid inlet (18) is provided for introducing a fluid (20) into the chamber (14) below a level (22) of the body of liquid (16) to cause the fluid (20) to interact with the liquid (16) and to migrate therethrough towards an outlet (24) for discharging a product (26) of the interaction from the chamber (14). A liquid circulation passage (28) is implemented, having a weir (30) which is operatively located near the level of the body of liquid (16), and a port (34) which is located remote from the weir (30) and in fluid (20) communication with the fluid inlet (18) so as to enable the liquid (16) to flow over the weir (30)

(Continued)

DETAIL H through the liquid circulation passage (28) and through the port (34).

18 Claims, 6 Drawing Sheets

(56) References Cited

U.S. PATENT DOCUMENTS

| | | |
|---|---|---|
| 5,650,120 A | 7/1997 | Morando |
| 2017/0217772 A1 | 8/2017 | Stiller |
| 2018/0216890 A1* | 8/2018 | Bosworth ............ F27D 27/005 |
| 2018/0245171 A1 | 8/2018 | MacRae |

FOREIGN PATENT DOCUMENTS

| | | |
|---|---|---|
| RU | 2087820 C1 | 8/1997 |
| RU | 2089639 C1 | 9/1997 |
| RU | 14075 U1 | 6/2000 |
| WO | WO 91/05214 | 4/1991 |
| WO | WO 96/11359 | 4/1996 |

OTHER PUBLICATIONS

Plevan M et al, "Thermal cracking of methane in a liquid metal bubble column reactor: Experiments and kinetic analysis", International Journal of Hydrogen Energy, Jul. 6, 2015, vol. 40(25), pp. 8020-8033, XP029245505.

\* cited by examiner

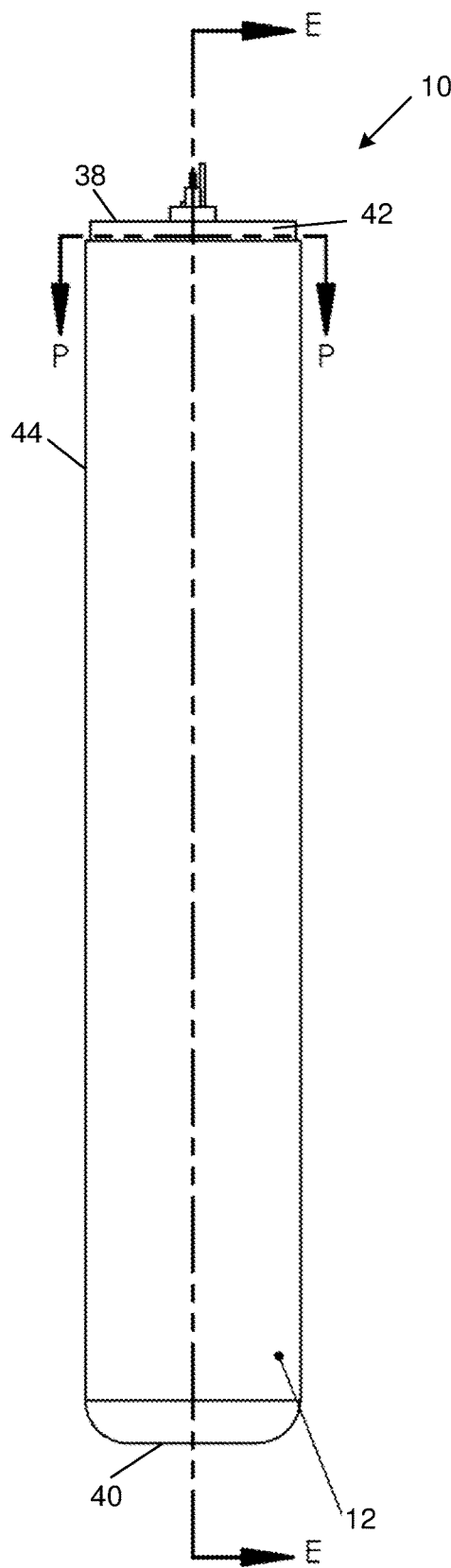
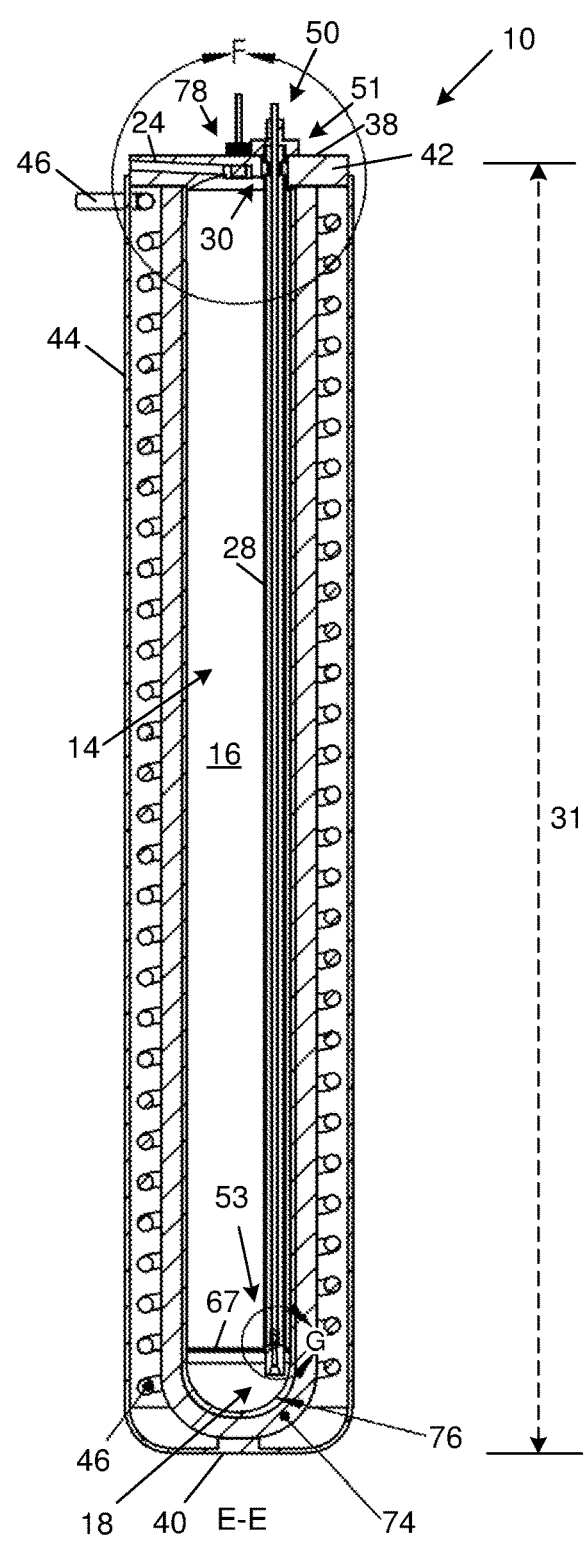
Figure 1
Figure 2

P-P

DETAIL F

DETAIL H

FURNACE, FLUID FEED COMPONENT, FLUID REFORMING SYSTEM AND METHOD OF REFORMING A FLUID

CROSS-REFERENCE TO RELATED APPLICATIONS

This application is a national stage filing under 35 U.S.C. 371 of PCT/IB2020/058714, filed Sep. 18, 2020, which International Application was published by the International Bureau in English on Mar. 25, 2021, as WO 2021/053602, which claims priority from South African provisional patent application number 2019/06187 filed on 19 Sep. 2019, which applications are hereby incorporated by reference in their entirety in this application.

FIELD OF THE INVENTION

This invention relates to furnaces, reactors and reformers. More particularly, but not exclusively, this invention relates to a furnace or reactor or reformer for reforming a fluid within a hot liquid.

BACKGROUND TO THE INVENTION

Current methods of removing floating substances in furnaces, reactors or reformers require opening of a vessel or chamber of the furnace. Periodic opening of the vessel to the atmosphere is needed and in the case of metal smelting furnaces, a surface of a molten liquid or a level of molten metal is scraped with a hand-held or mechanical rake, ladle or similar instrument to remove the floating items (sometimes called slag).

It may be difficult or impossible to control the exact level of a hot liquid inside a furnace. Liquid level control may be especially difficult in cases where molten metals are contained inside the furnace. Reformers are devices which are used to treat fluids, by introducing the fluid to a heated liquid inside the reformer and enabling a chemical reaction to occur. Fuel reformers are devices that enable steam reforming, autothermal reforming or partial oxidation, which is a type of chemical synthesis that can convert hydrocarbons to alternative products. Currently known reformers and especially fuel gas reformers that utilise molten metal have the disadvantage that they generally require the metal to be heated separately before bringing the molten metal into contact with the gas which is to be reformed. The molten metal thus needs to be transferred from a separate heating vessel to the reformer, which is not only a dangerous procedure, but it may also result in heat losses and inefficiencies. A separate oxidizing or conventional combustion heated or arc furnace pot or buffer tank may thus be required for many reforming processes, and the molten metal is usually pumped or mechanically moved from the furnace to the reformer.

A molten metal furnace or reformer can potentially produce a combination of solid, foamy or liquid slag on the surface of the molten metal. This slag may interfere and negatively impact the quality of products that may be produced by the furnace. Known methods of removing slag are cumbersome and inefficient. A layer of slag or waste material may form on top of molten metal or on top of a liquid inside the reformer. Currently known systems and methods do not provide for timeous removal of this waste material from the surface of the liquid, and requires opening the vessel and exposing the contents to air for a hand-held or mechanical rake, ladle or similar instrument to be inserted and to remove the slag. This may lead to extended contact between the waste material or slag and the other products produced in the reformer or furnace, and unwanted reactions or the formation of unwanted by-products may occur.

Increasing or varying the temperature of a molten metal inside a furnace may cause the volume (and therefore a level of the molten metal) to change in the furnace or reactor. Current furnaces or reactors do not provide means to effectively control the level of liquid in the furnace or reactor. Because the liquid level fluctuates, automatic and controlled removal of the slag may be challenging or impossible during operation. Typically, the furnace operations would need to be shut down or operated in a safe mode before opening the furnace. A layer of slag would then be manually scraped off before continuing the furnace operation. For smelting of metal, high temperatures in the furnace is required (for example temperatures in excess of about 1000° C.). These high temperatures may present challenges in terms of materials and mechanical operation. Effective level control at these temperatures may be difficult or impossible with currently known systems and methods. In conventional ovens and furnaces the slag is removed by mechanical scraping, raking, tapping, or by utilising a ladle.

Accordingly, there is scope to address the aforementioned disadvantages and problems, or at least to provide a useful alternative to the known devices, systems and methods.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a furnace comprising:
- a vessel that defines a chamber therein for holding a body of liquid;
- a fluid inlet for introducing a fluid into the chamber below a level of the body of liquid to cause the fluid to interact with the liquid and to migrate therethrough towards an outlet for discharging a product of the interaction from the chamber; and
- a liquid circulation passage having a weir which is operatively located near the level of the body of liquid, and a port which is located remote from the weir and in fluid communication with the fluid inlet so as to enable the liquid to flow over the weir through the liquid circulation passage and through the port.

Further features may provide for the port to be configured to draw the liquid therethrough to mix with the fluid, so that the mixture is introduced into the chamber through the inlet; for the mixture to be caused to migrate through the liquid; and for the weir to be operatively located near a desired or intended level of the body of liquid to control the level of the body of liquid as the liquid flows over the weir.

Still further features may provide for the product to include a fluid product and/or a solid product or combination thereof; for the outlet to be arranged to discharge one or both of the fluid product and the solid product; and for the fluid product to be a gas product, alternatively for the fluid product to be a froth or a foam, or a liquid product.

Yet further features may provide for the furnace to be operable as a fluid reformer; for the furnace to be arranged to cause the fluid to decompose or to break down into one or more of its constituent elements which may form part of the product; for the vessel to be arranged to hold a molten material as the body of liquid in use; and for the molten material to be a molten metal or a molten salt, or a combination of these.

Further features may provide for the furnace to include a product removing device or cleaning device; for the product removing device or cleaning device to be a skimming device for skimming a surface of the body of liquid in the chamber; for the skimming device to be arranged to separate the product from the liquid in use; for the skimming device to be in communication with the outlet to discharge the product from the outlet; for the product removing device or skimming device to include a moveable member that automatically skims the surface of the body of liquid to separate the product therefrom in use; for a driving arrangement to be provided to drive the moveable member of the skimming device or of the product removing device; and for the driving arrangement to be an electric motor with gears or a similar mechanical driving device.

Still further features may provide for the skimming device or product removing device to be a pump; for the moveable member to be a vane of the pump; for the pump to be a rotary lobe pump; for the moveable member to be a vane or lobe of the rotary lobe pump; and for the pump to include a plurality of vanes or lobes arranged to separate solid product and/or the fluid product from the liquid.

Yet further features may provide for a fluid acceleration device to be provided at the fluid inlet for accelerating the fluid therethrough; for the fluid acceleration device to be in fluid communication with the port of the liquid circulation passage; and for the fluid acceleration device to be a venturi, a nozzle, an aspirator, an educator, an ejector, or a jet pump.

Further features may provide for the fluid acceleration device to be configured to cause the fluid to mix with the liquid to form bubbles or nanobubbles.

Still further features may provide for the outlet to be an upwardly angled discharge passage or aperture in communication with the product removing device or skimming device; for the product removing device or skimming device to be arranged to cause the solid product to be urged along the upwardly angled discharge passage, while enabling the gas product or fluid product to escape; and for the product removing device or skimming device and the upwardly angled discharge passage to be arranged such that the liquid may be enabled to flow back into the chamber under the influence of gravity, for example if the liquid is inadvertently or otherwise moved into the upwardly angled discharge passage, thereby separating the liquid from the solid product.

Yet further features may provide for the outlet to be a horizontal passage, or a downwardly angled discharge passage for enabling the fluid product to be discharged or tapped from the outlet; and for the downwardly angled discharge passage to be arranged at any suitable angle or at an oblique angle relative to horizontal.

A further feature may provide for the furnace to include a fluid feed tube in fluid communication with the inlet. The fluid feed tube may be cylindrical, or it may have another cross-sectional shape such as oval, square, rectangular or any other cross-sectional shape capable of providing a conduit for fluid.

Further features may provide for the liquid circulation passage to be an elongate passage that extends from a top of the furnace towards a bottom of the furnace; for the liquid circulation passage to be a liquid circulation tube; for the liquid circulation tube to be provided around the fluid feed tube; for the liquid circulation tube to optionally be arranged concentrically with the fluid feed tube; and for the lower end of the liquid circulation tube to include a plug that has the fluid acceleration device therein and that defines the port for providing fluid communication between the liquid circulation tube and the fluid acceleration device. The liquid circulation tube may be cylindrical, or it may have another cross-sectional shape such as oval, square, rectangular or any other cross-sectional shape capable of providing a conduit for liquid.

A still further feature may provide for the weir to be defined by an upper end of the liquid circulation tube, for example by way of a slot in the upper end of the liquid circulation tube.

Yet further features may provide for the liquid circulation tube and the fluid feed tube to form part of a rod-shaped component which is operatively lowered into the chamber; and for the rod-shaped component to be fastened to the top of the furnace, so that the weir may define the desired level of the body of liquid.

Further features may provide for the liquid circulation tube to be removably mountable to the top of the furnace; and for the liquid circulation tube to be removably mountable to the top of the furnace with a quick-release type connection such as a bayonet-type connection, alternatively for a snap-fit, or a threaded connection to be used.

Still further features may provide for the furnace to include a fluid dispersing device; for the fluid dispersing device to be a plate with a plurality of apertures therein; and for the fluid dispersing device to be fastened to the lower end of the liquid circulation passage.

Yet further features may provide for a separator to be provided downstream of the outlet to separate the fluid product and the solid product; and for a cooling mechanism and a heat transfer or heat insulating device to be provided at the separation device.

Further features may provide for the furnace to include a heating element for heating the liquid in the chamber of the vessel to an elevated temperature; for the heating element to be an electric heating coil; for the electric heating coil to be an induction coil to provide induction heating; and for the liquid to be heated to a temperature higher than ambient, or to a temperature of at least 220 degrees Celsius, with a preferred operating range of 800 to 1100 degrees Celsius, or with a preferred operating temperature of about 1100 degrees Celsius.

Still further features may provide for the vessel to be a pressure vessel; for the vessel to include an outer layer and an inner layer; and for the heating element to be provided between the inner and outer layers of the vessel.

Yet further features may provide for the furnace to include insulative material to inhibit heat transfer from an interior of the chamber of the vessel.

Further features may provide for the body of liquid to be a body of molten material such as molten metal or molten salt, or a combination thereof; for the molten metal to be a metal alloy; for the molten metal to include one or more metallic elements selected from the group consisting of Bismuth, Nickel, Platinum, Copper, Iron, Cobalt, Chromium, Molybdenum, Silicon, Aluminium and Manganese, or combinations of these.

Still further features may provide for the fluid that is introduced by the fluid feed tube to be a feed gas or a feed liquid selected to interact with the molten metal or salt; for the feed gas to be a hydrocarbon-based gas selected from the group consisting of methane, propane, ethane, butane, and other hydrogen containing compounds like silane and hydrogen sulphide; and for the feed liquid to be a liquid selected from the group consisting of hydrocarbon liquids, waste and organic oils and plastics; and for the feed liquid to optionally include solid particles.

In accordance with another aspect of the invention there is provided a fluid reforming system, the system comprising:
a vessel that defines a chamber therein for holding a body of liquid;
a fluid inlet for introducing a fluid into the chamber below a level of the body of liquid to cause the fluid to interact with the liquid and to migrate therethrough towards an outlet for discharging a product of the interaction from the chamber; and
a liquid circulation passage having a weir which is operatively located near the level of the body of liquid, and a port which is located remote from the weir and in fluid communication with the fluid inlet so as to enable the liquid to flow over the weir through the liquid circulation passage and through the port.

In accordance with another aspect of the invention there is provided a fluid feed component comprising:
an upper end arranged to be fixed to a vessel for holding a body of liquid in use;
a lower end arranged to be provided below a level of the body of liquid in the vessel;
a fluid inlet near the lower end, for introducing a fluid into the vessel below the level of the body of liquid in the vessel so as to cause the fluid to interact with the liquid and to migrate therethrough; and
a liquid circulation passage extending from the upper end towards the lower end, having a weir which is operatively locatable near the level of the body of liquid, and a port which is located remote from the weir and in fluid communication with the fluid inlet so as to enable the liquid to flow over the weir through the liquid circulation passage and through the port.

A further feature may provide for the port to be configured to draw the liquid therethrough to mix with the fluid, so that the mixture is introduced into the vessel through the inlet.

Still further features may provide for the fluid feed component to include a fluid feed tube in fluid communication with the inlet; and for the fluid feed component to be operable as a fluid reforming component. The fluid feed tube may be cylindrical, or it may have another cross-sectional shape such as oval, square, rectangular or any other cross-sectional shape capable of providing a conduit for fluid.

Yet further features may provide for the upper end of the fluid feed component to be arranged to be fixed to a furnace that includes the vessel, the vessel defining a chamber for holding the body of liquid in use; and for the body of liquid to be a molten material such as a molten metal or a molten salt.

Further features may provide for a fluid acceleration device to be provided at the fluid inlet for accelerating the fluid therethrough; for the fluid acceleration device to be in fluid communication with the port of the liquid circulation passage; and for the fluid acceleration device to be a venturi, a nozzle, an aspirator, an educator, an ejector, or a jet pump.

A still further feature may provide for the fluid acceleration device to be configured, in use, to cause the fluid to mix with the liquid to form bubbles or nanobubbles.

Yet further features may provide for the liquid circulation passage to be an elongate passage that extends from the upper end to the lower end; for the liquid circulation passage to be a liquid circulation tube; for the liquid circulation tube to be provided around the fluid feed tube; for the liquid circulation tube to optionally be arranged concentrically with the fluid feed tube; and for the lower end of the liquid circulation tube to include a plug that has a fluid acceleration device therein and that defines the port for providing fluid communication between the liquid circulation tube and the fluid acceleration device. The liquid circulation tube may be cylindrical, or it may have another cross-sectional shape such as oval, square, rectangular or any other cross-sectional shape capable of providing a conduit for liquid.

A further feature may provide for the weir to be defined by an upper end of the liquid circulation passage or tube, for example by way of a slot in the upper end of the liquid circulation passage.

Still further features may provide for the fluid feed component to be a rod-shaped component; for the rod-shaped component or fluid feed component to be operatively lowerable into the vessel or chamber; and for the rod-shaped component or fluid feed component to be capable of being fastened to a top of the vessel, so that the weir may define the desired level of the body of liquid.

Yet further features may provide for the fluid feed component to be removably mountable to the top of the vessel with a quick-release type connection such as a bayonet-type connection, alternatively for a snap-fit, or a threaded connection to be used.

In accordance with another aspect of the invention there is provided a method of reforming a fluid, the method comprising:
heating a body of liquid in a vessel that defines a chamber therein for holding the liquid;
introducing a fluid into the chamber below a level of the body of liquid with an inlet, to cause the fluid to interact with the liquid and to migrate therethrough towards an outlet for discharging a product of the interaction from the chamber;
utilising a liquid circulation passage having a weir which is operatively located near the level of the body of liquid and a port which is located remote from the weir and in fluid communication with the fluid inlet; and
enabling the liquid to flow over the weir through the liquid circulation passage and through the port.

A further feature may provide for the method to include the step of causing the liquid to be drawn through the port to mix with the fluid, so that the mixture is introduced into the chamber through the inlet.

Still further features may provide for the step of heating the body of liquid to include creating a heat gradient in the body of liquid; and for the method to include heating a material, a metal or a salt in the vessel until the material, metal or salt becomes molten so as to form the body of liquid, and once the material, metal or salt contained in the body of liquid is in a liquid phase, inserting the liquid circulation passage and submerging it below the level of the body of liquid such that the weir is near the level of the body of liquid.

Yet further features may provide for the method to include providing a product removing device or cleaning device; for the product removing device to be a skimming device for skimming a surface of the body of liquid in the chamber; and for the method to include arranging the product removing device to automatically skim or clean the surface of the body of liquid so as to remove the product therefrom.

A further feature may provide for the method to include the step of positioning the weir to be operatively located near a desired or intended level of the body of liquid to control the level of the body of liquid as the liquid flows over the weir.

Embodiments of the invention will now be described, by way of example only, with reference to the accompanying drawings.

BRIEF DESCRIPTION OF THE DRAWINGS

In the drawings:

FIG. 1 is a front view of an example embodiment of a furnace or reactor;

FIG. 2 is a sectional view taken along line E-E in FIG. 1, illustrating the internal components or parts of the furnace in more detail;

DETAILED DESCRIPTION WITH REFERENCE TO THE DRAWINGS

Figure 3:
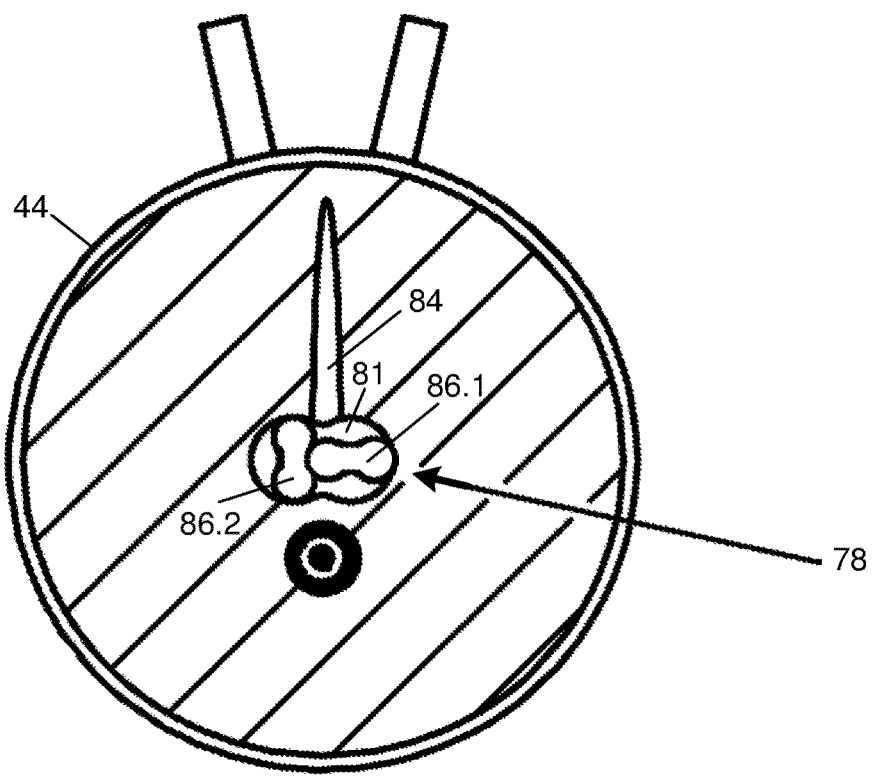
FIG. 3 is a sectional view taken along line P-P in FIG. 1, illustrating a particle collection and skimming device located near a top of the furnace.

There is provided a furnace, reformer or reactor for removing slag or product from a hot liquid. The reformer is arranged for introducing a gas or fluid into an interior of the reformer, below a level of the hot liquid. The reformer may include an automatic skimmer for skimming a surface of the hot liquid. A conduit or tube is provided for conveying the liquid from a surface of the hot liquid towards an inlet where the fluid or gas is introduced, pumped or injected into the furnace, preferably below the surface of the liquid inside the furnace. The hot liquid inside the furnace may typically be molten metal or molten salt, or a combination thereof, but other types of liquids may also be used. At the inlet, the liquid is mixed with the fluid after which it is injected or introduced into the interior of the reformer or furnace. A siphoning device or weir may be used to enable the liquid to flow from an upper surface of the liquid through the conduit and towards the inlet. A fluid communication port may be provided between a lower portion of the conduit and the inlet. The conduit may include a narrow section or nozzle where through the fluid may be forced or blown, drawn in, sucked or vacuumed towards the inlet. The narrow section may also be referred to as a fluid acceleration device such as an aspirator, a nozzle, an educator, an ejector, a venturi or a jet pump. A fluid reforming system and a method of reforming a fluid may also be provided by the disclosed embodiments. There is also disclosed a method of cleaning a surface of a body of liquid.

Referring to the drawings, there is provided an example embodiment of a furnace (10) or reformer. The furnace or reformer may include a vessel (12) or container that defines a chamber (14) therein for holding a body of liquid (16), preferably at an elevated temperature relative to ambient. A fluid inlet (18) may be provided for introducing a fluid (20) (shown in FIGS. 5 and 6) into the chamber (14) below a level (22) of the body of liquid (16). In the present embodiment, the fluid (20) is caused to interact with the liquid (16) and to migrate therethrough towards an outlet (24) for discharging a product (26) of the interaction from the chamber (14). A liquid circulation passage (28) may preferably be provided or implemented, for circulating the liquid (16) therethrough. The liquid circulation passage (28) may include a weir (30) (shown in FIG. 6) at or near an upper end (32) of the passage (28). The liquid circulation passage (28) may also be referred to as a level setting device which may be used to control the flow of the liquid (16) from the level (22) towards the inlet (18). The level (22) may be accurately controlled by placement of the weir (30), irrespective of increasing or decreasing the amount of introduced feed fluid (20), and irrespective of variations in temperature of the liquid (16) when energy provided to a heating element (46) is varied. In the present embodiment, the weir (30) is operatively located near the level (22) of the body of liquid (16), so as to enable the liquid (16) to flow over the weir (30) through the passage (28) and through a port (34) in fluid communication with the fluid inlet (18). The port (34) is preferably located remote from the weir (30). As shown in more detail in the sectional view in FIG. 5, the port (34) may be configured to draw the liquid (16) therethrough to mix with the fluid (20), so that the mixture (36) is introduced into the chamber (14) through the inlet (18). In the present embodiment, the liquid circulation passage (28) is a tube or conduit for conveying the liquid (16) from the level (22) to the port (34). The liquid circulation tube may be cylindrical, or it may have another cross-sectional shape such as oval, square, rectangular or any other cross-sectional shape capable of providing a conduit for liquid.

Referring to FIG. 1, the vessel (12) of the furnace (10) or reformer may be a cylindrical vessel, however other shapes are also possible. The furnace (10) includes a top (38) and a bottom (40). A cover, cap, closure or lid (42) may be provided for closing the top (38) of the furnace. The lid (42) may be contoured, curved, angled, or otherwise shaped to fit the top (38) of the furnace (10) to close it. In the example embodiment shown, the outlet (24) may be a hole which is provided in the lid (42) (for example by drilling), and which may extend from an outer periphery (44) of the vessel (12) of the furnace (10), towards the interior of the chamber (14). The outlet (24) may be angled and may extend upwardly from a central region or interior of the chamber (14) of the furnace (10), towards the outer periphery (44), as is evident in FIGS. 2, 4 and 6. A heating element (46) may be provided for heating the liquid (16) in the chamber (14) of the vessel (12) to an elevated temperature. In the example embodiment, the heating element (46) is an electric heating coil to provide induction heating. However, other types of heating may also be used. The body of liquid (16) may for example be a liquid metal and the metal may be heated to a melting temperature of the metal, so that it becomes molten. However, the present disclosure extends to furnaces for heating other types of materials such as salts and solids. The furnace (10) may be capable of heating a metal to become the liquid (16). The liquid (16) may be heated to temperatures higher than ambient, or to temperatures of at least 220 to 1200 degrees Celsius. However, embodiments may be possible wherein the liquid is heated to temperatures of below 220 degrees Celsius (for example to temperatures of more than 50 degrees Celsius, or more than 100 degrees Celsius). A preferred operating range of 800 to 1100 degrees Celsius may be used. An operating temperature of the liquid (16) may preferably be about 1100 degrees Celsius. In the case of the body of liquid (16) being molten metal, the molten metal may be referred to as a liquid metal catalyst or a liquid catalyst. The furnace may be operable as a fluid reformer.

Although not presently preferred, it may also be possible to heat water or other liquids as the body of liquid in the furnace.

Figure 4:
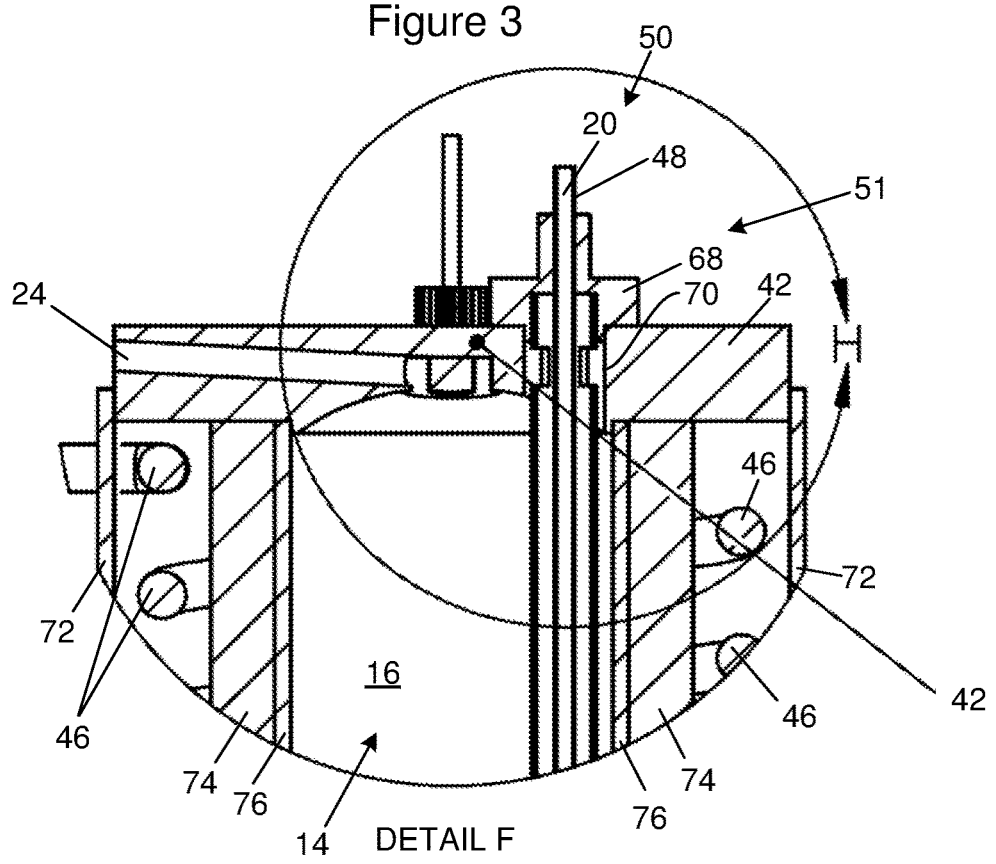
FIG. 4 is an enlarged view, of a portion designated "F" in FIG. 2, illustrating the top of the furnace in more detail.
Figure 5:
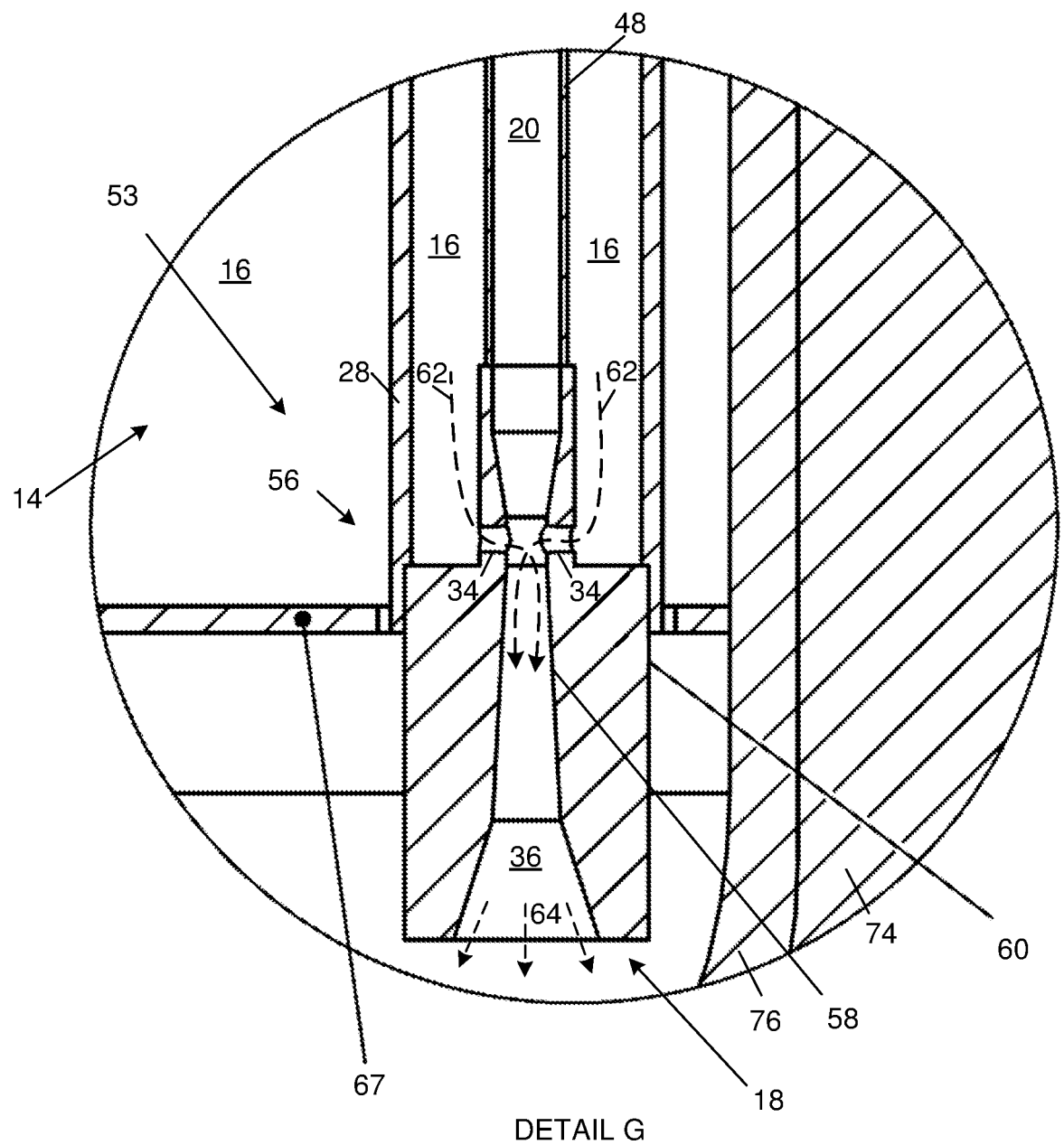
FIG. 5 is an enlarged view, of a portion designated "G" in FIG. 2, illustrating a fluid acceleration device in more detail.
Figure 6:
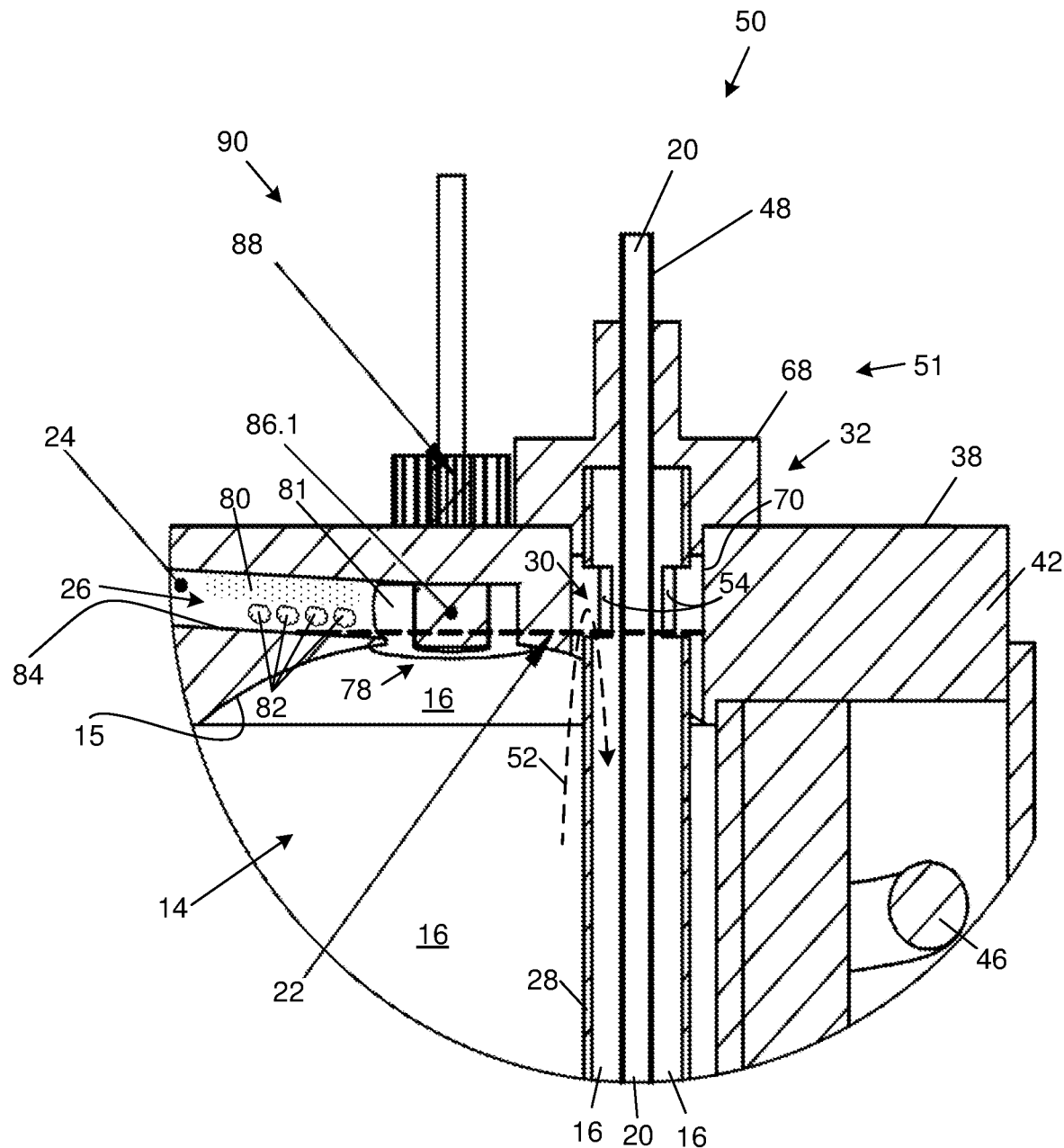
FIG. 6 is an enlarged view, of a portion designated "H" in FIG. 4, showing a weir that is located near a top of a liquid circulation passage or tube.
Figure 7:
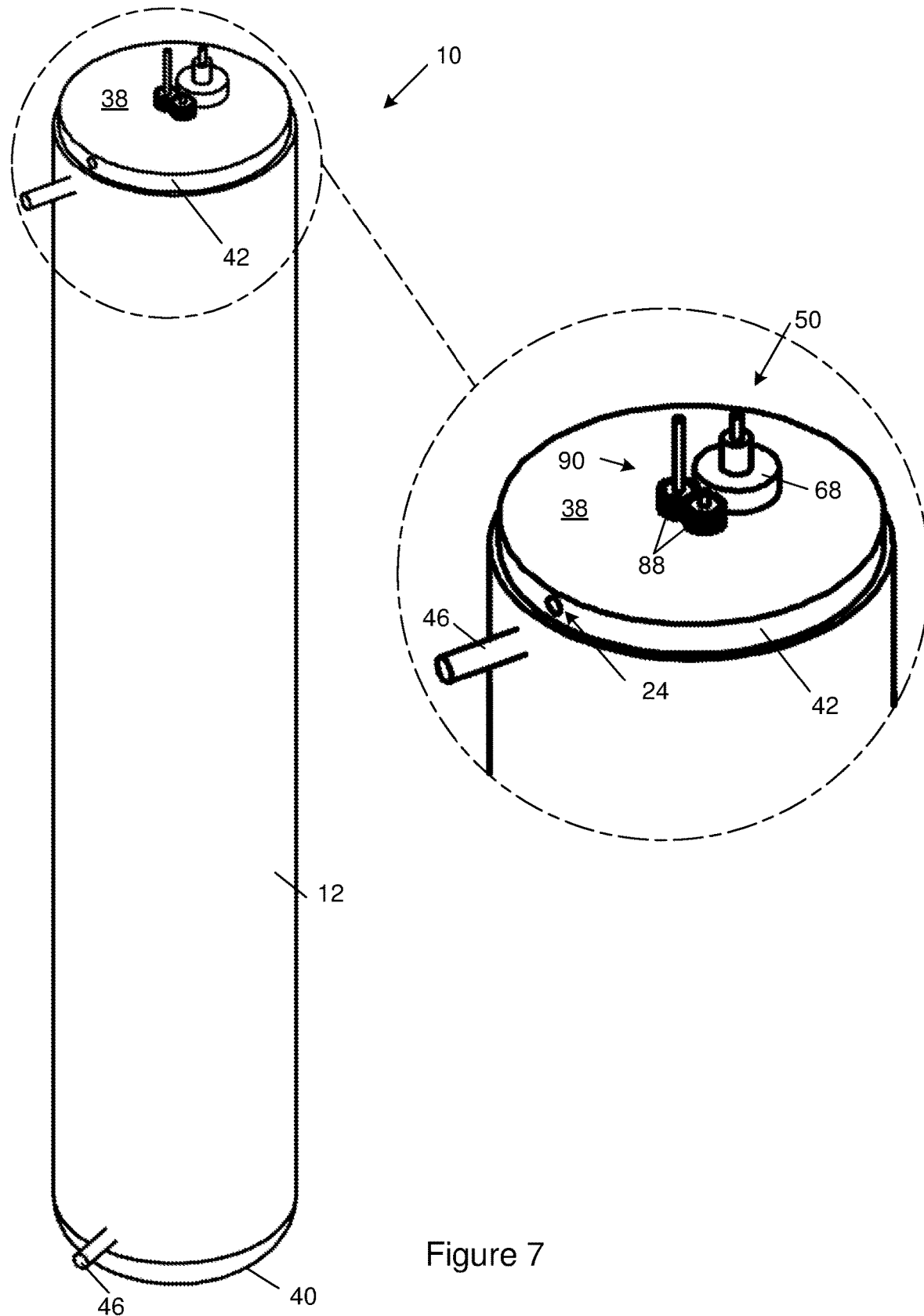
FIG. 7 is a three-dimensional view of the exemplary furnace of FIG. 1, also showing an enlarged view of the top of the furnace.

Referring now to the enlarged views in FIGS. 4 and 6, the furnace may include a fluid feed or fluid feed tube (48) upstream of the fluid inlet (18) (shown in FIG. 5). The fluid feed (48) may be in fluid communication with the inlet (18), for introducing the fluid (20) into the chamber (14) through the inlet (18). The fluid feed (48) may form part of a fluid feed component (50) which may be a rod-shaped component or unit that may operatively be lowerable into the furnace (10) from the top (38) thereof, or which may otherwise be affixed to the vessel (12). The rod-shaped component (50) may be fastened to the top (38) of the furnace, so that the weir (30) may be located at or near the level (22) of the body of liquid (16) in use. A vertical height (31) of the weir (30) from the bottom (40) of the furnace (10) may thus be predetermined or predefined, to facilitate interaction between the level (22) of the liquid (16) and the weir (30) (see FIGS. 2 and 6). The level (22) of the liquid (16) may depend on the amount of liquid (e.g. molten metal or other heated liquid) contained in the chamber (14) in use, as well as the volume contained in the liquid circulation passage (28) that may be displaced during operation. The fluid feed component (50) may include an outer tube which may form the liquid circulation passage (28) or liquid circulation tube. The fluid feed tube (48) may be an inner tube provided inside the outer tube (28). In some embodiments, the inner tube may be provided concentrically with the outer tube, however embodiments are possible wherein they are not concentric with one another and/or wherein the fluid feed tube may be separate from the liquid circulation passage. The outer tube (28) may be made from a heat resistant and/or rigid material, such as a metal (which may for example have a high melting point, in the case of the liquid (16) being a metal). The outer tube (28) or liquid circulation passage may include a slot (54) or aperture that defines the weir (30) or gate. One or more slots or apertures may be used. The weir (30) may be defined at or near the upper end (32) of the liquid circulation passage (28). The weir (30) may be located such that the level (22) of the heated liquid (16) is maintained, kept constant, or controlled during operation of the furnace (10), as the liquid may flow over the weir (30) and into the liquid circulation passage (28). This is diagrammatically indicated by a directional arrow (52) in FIG. 6. The level (22) of the liquid (16) may also be referred to as an overflow level. The fluid feed tube may be cylindrical, or it may have another cross-sectional shape such as oval, square, rectangular or any other cross-sectional shape capable of providing a conduit for fluid.

It will be appreciated that the fluid feed component (50) may be provided separately from the furnace (10), or it may be retrofitted to an existing furnace. The fluid feed component may be operable as a fluid reforming component. The present disclosure extends to a fluid feed component (50) having an upper end (51) arranged to be fixed to the vessel (12). It will be appreciated that the vessel may be an enclosed vessel or it may be an open vessel. The vessel (12) may define the chamber (14) for holding the body of liquid (16) in use. The upper end (51) of the fluid feed component may also be referred to as a proximal end. It will be appreciated that the vessel need not necessarily form part of a furnace (and the vessel may simply be a container for holding a liquid), but in the presently preferred embodiment, the vessel forms part of a furnace. The fluid feed component (50) may further include a lower end (53) arranged to be provided below the level (22) of the body of liquid (16) in the vessel (12) or chamber (14). The lower end (53) of the fluid feed component may also be referred to as a distal end. In the present embodiment, the fluid feed component (50) further includes a fluid inlet (18) near the lower end (53), for introducing the fluid (20) into the vessel (12) or chamber (14) below the level (22) of the body of liquid (16) in the vessel (12) or chamber (14), so as to cause the fluid (20) to interact with the liquid (16) and to migrate therethrough. In the present embodiment, the liquid circulation passage (28) forms part of the fluid feed component (50), and it extends from the upper end (51) towards the lower end (53). The liquid circulation passage (28) includes the weir (30) which is, in the present embodiment, operatively, or in use, locatable near the level (22) of the body of liquid (16) in the vessel (12). The liquid circulation passage further includes the port (34) which is located remote from the weir (30) and in fluid communication with the fluid inlet (18) so as to enable the liquid (16) to flow over the weir (30) through the liquid circulation passage (28) and through the port (34) into the vessel (12) or container, or into the chamber (14), so as to interact with the liquid (16) in the vessel (12).

The liquid circulation passage (28) may be an elongate passage that extends from the top (38) of the furnace (10) (or from a location near the top (38)) towards the bottom (40) of the furnace. A lower end (56) of the liquid circulation passage (28) may include a fluid acceleration device (58) thereat. In the present embodiment, the fluid acceleration device (58) may be provided or housed inside a plug (60) which plugs the lower end (56) of the liquid circulation passage (28). The plug (60) may define or include the port (34) which may be arranged to provide fluid communication between the liquid circulation passage (28) and the fluid acceleration device (58). The fluid acceleration device (58) may be provided upstream of the inlet (18). The fluid acceleration device (58) may include a narrow section which may be arranged to accelerate the fluid (20) therethrough. The fluid acceleration device (58) may be in fluid communication with the port (34), which may be in the form of one or more apertures or openings that extend from the liquid circulation passage (28) to the fluid acceleration device (58). The port (34) may be defined by a body of the plug (60), or the port may form part of the liquid circulation passage (28). In the present embodiment, the fluid acceleration device (58) forms a venturi type device, however other types of fluid acceleration devices may also be used such as, but not limited to, an aspirator, a nozzle, an educator, an ejector, or a jet pump, or any narrowing section of a conduit. A mechanical pump may also be used. The fluid acceleration device (58) may have a conical shape towards the inlet (18), or it may have a cross-sectional shape like a frustum, or any shape that may enhance the formation of fluid bubbles in the liquid. It will also be appreciated that embodiments are possible wherein the fluid acceleration device may be integrally formed or otherwise provided with the fluid feed component, and it need not be housed in a plug.

The liquid circulation passage (28) or tube may be an elongate passage that extends from the upper end (51) of the fluid feed component (50) to the lower end (53) thereof. In the present embodiment, the liquid circulation passage or tube (28) is provided around the fluid feed tube (48), and it may optionally be arranged concentrically with the fluid feed tube (48). The lower end (56) of the liquid circulation passage or tube may include the plug (60) with the fluid acceleration device (58) therein, and that preferably defines the port (34) for providing fluid communication between the liquid circulation tube (28) and the fluid acceleration device (58). The fluid acceleration device (58) may include an integrated diffuser. In the present embodiment, a vertically integrated diffuser is provided which may enable the feed fluid (20) to intersperse into the liquid (16), as is diagrammatically illustrated by directional arrows (64) in FIG. 5. the fluid acceleration device (58) may be configured to cause the fluid (20) to mix with the liquid (16) to form the mixture (36). A pressure difference or pressure drop may for example be created between the liquid circulation passage (28) and the fluid acceleration device (58). In other words, the pressure difference may exist over the port (34), which pressure difference may cause the liquid (16) to be drawn through the port (34) towards the fluid acceleration device (58). Moreover, gravity may also cause the liquid (16) to flow into and through the port (34). Hence, the liquid (16) may be drawn through the port (34), and into the fluid acceleration device (58) where the liquid (16) is mixed with the fluid (20). The feed fluid (20) may form a stream and the liquid (16) may be drawn or pulled into this stream of fluid. The liquid (16) may thus be sucked (or "vacuumed") into this stream of fluid (20). Alternatively, the liquid may be blown or forced through the port (34) under pressure or gravity or with a pump.

When the liquid (16) is mixed with the fluid (20) as aforesaid, and when the fluid (20) is accelerated through the fluid acceleration device (58), bubbles or nanobubbles may be formed. In the case of the feed fluid (20) being a gas or a gaseous substance, and the liquid being a molten metal, gas bubbles or nanobubbles may form. It should be appreciated that embodiments are possible wherein the fluid acceleration device (58) may be omitted (and for example replaced by a straight tube or passage which is connected to the port (34)), and wherein the feed fluid may be introduced to the inlet (18) by providing pressure on the fluid feed (48). Pressure may be provided on the fluid feed (48) by using a mechanical device such as a pump or piston, hydraulically, electromechanically or electromagnetically etc. In such an embodiment, the mixture (36) may be created by drawing or urging the liquid (16) through the port (34) and causing it to interact with the feed fluid (20). The flow of the feed fluid (20) (and/or gravity) may cause the liquid to be drawn through the port (34) and towards the inlet (18) without requiring the fluid acceleration device (58). Alternatively, a liquid moving device such as a pump may also be used to move the liquid (16) through the liquid circulation passage (48).

Once the mixture (36) is formed, it moves towards the inlet (18), wherefrom it is discharged or introduced into the chamber (14), as is diagrammatically indicated by the directional arrows (64) in FIG. 5. The furnace (10) may include a fluid dispersing device (67) near the bottom (40). The fluid dispersing device (67) may be a plate with a plurality of apertures therein, such as a mesh plate. The fluid dispersing device (67) may be fastened to the lower end (56) of the liquid circulation passage (28). The fluid dispersing device (67) may be arranged to facilitate dispersion of the fluid (20) and/or the mixture (36) into the body of liquid (16) in the chamber (14). In the case of a feed gas being used as feed fluid (20), the fluid dispersing device (67) may disperse gas bubbles into the body of liquid (16) and the mixture or gas may be enabled to bubble through the liquid (16). It should be appreciated that a major portion of the liquid may be located in a body of liquid (16) in the chamber (14), whereas an amount of the liquid (16) may flow through the liquid circulation passage (28) in use, preferably under the influence of gravity. The amount of liquid (16) inside the liquid circulation passage (16) may be separated from the remainder of the body of liquid (16) in the chamber (14).

The liquid circulation tube or passage (28) may be removably mountable to the top (38) of the furnace (10) and it may form part of the fluid feed component (50). A flange, which may be referred to as a feed fluid flange (68) may be provided to facilitate attachment of the upper end (32) of the liquid circulation tube (28) to the top (38) of the furnace (10). The flange (68) may also form part of the upper end (51) of the fluid feed component (50). The liquid circulation tube or passage (28) may be removably mountable to the top (38) with a quick-release type connection such as a bayonet-type connection, alternatively a snap-fit, a quick-release, or a threaded connection may be used. The fluid feed component (50) may thus be lowered into an aperture (70) in the lid (42) (shown in FIG. 6), whereafter the flange (68) may be fixed to the lid (42). It is envisaged that the liquid circulation tube (28) and/or the fluid feed component (50) may be removed before the liquid (16) is cooled down or for any maintenance reason. It will be appreciated that the fluid feed component need not necessarily be lowered into the chamber (14) through the lid (42), and it may be affixed to the vessel (12) at the sides or periphery (44) of the vessel (12), or in another way.

The vessel (12) may be a pressure vessel and it may be arranged to be operated under pressure. As is more evident from the enlarged sectional view in FIG. 4, the vessel (12) may include an outer layer (72) and an inner layer (74). In the present embodiment, the heating element (46) may be provided between the inner layer (74) and the outer layer (72) of the vessel (12). The chamber (14) may be defined by a container such as a tub (76) which may be made of a rigid material, such as a high strength metal with a high melting point, for instance when the liquid (16) being heated is a molten metal. The outer layer (72) may define the outer periphery (44) of the furnace (10), and may provide structural integrity to the vessel (12). The outer layer (72) may be constructed of a strong, rigid material, to provide structural strength when the furnace is operated, for example to provide resistance against high operating pressures in use. The inner layer (74) may be made from a heat resistant material and/or an insulative material, to inhibit heat transfer from an interior of the chamber (14) of the vessel (12). The inner layer may for example be made from a ceramic material and may provide structural strength.

In the example embodiment, and during use, the heating element (46) may be utilised to heat the liquid (16) in the chamber (14) (and/or to create a heat gradient therein) and the fluid (20) may be pumped or introduced into the chamber (14) below the level (22) of the liquid (16), through the fluid inlet (18). The fluid (20) and/or the mixture (36) of the fluid and the liquid (16) may be discharged from the inlet (18) and may be caused to interact with the body of liquid (16) in the chamber (14). The fluid (20) and/or mixture (36) may migrate through the liquid (16) towards the outlet (24). It is envisaged that it may be advantageous to provide the inlet (18) near the bottom (40) of the vessel (and/or near the bottom of the chamber (14)). This is because migration of the fluid (and/or the mixture (36)) through the body of liquid (16) may be facilitated if the inlet is near the bottom, and a reaction time between the fluid (20) or mixture (36) and the body of liquid (16) may be increased, because the fluid or mixture may take time to migrate through and eventually rise to the surface or level (22) of the body of liquid (16). The outlet (24) may be arranged for discharging a product (26) of the interaction from the chamber (14). It will be appreciated that the feed fluid (20) may be a feed liquid or a feed gas.

Referring to FIG. 6, the product (26) of the aforesaid interaction may include a generally fluid product (80) and/or a generally solid product (82). The outlet (24) may be arranged to discharge one or both of the fluid product (80) and the solid product (82). An example of solid product (82) that may be produced is carbon in the form of graphite and/or graphene, however other solid products may also be produced. It should be appreciated that embodiments are possible wherein only a fluid product, or only a solid product may be produced. In the present embodiment, the fluid product may be a gas product (80), however the fluid product may also be a froth, a foam, or a liquid product. The outlet (24) may be upwardly angled or sloped and it may be an upwardly angled discharge passage. In the case of the outlet being in the form of a drilled hole in the lid, the hole may have an angled or sloping surface (84) to form an upwardly angled discharge passage (also shown in the sectional view in FIG. 3) which slopes upwardly from inside the chamber (14) towards the outer periphery (44) of the furnace (10). The discharge passage or outlet (24) may be in communication with a product removing device (78) which may also be referred to as a skimming device or a cleaning device, and which is described in more detail below.

In the present embodiment, the product removing device (78) may be provided, mounted or housed in the lid (42) of the furnace (10) or reformer, as is more evident from the sectional views in FIGS. 3, 4 and 6. The product removing device (78) may be a skimming device for skimming a surface or level (22) of the body of liquid (16) in the chamber (14), as shown in FIG. 6. The skimming device (78) may be arranged to separate the product (26) from the liquid (16) in use by skimming the level or upper surface (22) thereof. The skimming device may be in communication with the outlet (24) to discharge the product from the outlet (24). In the present embodiment, the skimming device (78) includes a moveable member (86.1) that automatically skims the surface (22) of the body of liquid (16) so as to, in use, separate the product (26) therefrom. A driving arrangement (90) may be provided to drive the moveable member (86.1) of the skimming device (78). In the example embodiment illustrated in the drawings, the driving arrangement (90) is provided by one or more gears (88) that may be driven by an electric motor or other energy conversion device (not shown). The gears (88) may be spur gears that are rotated in a synchronous fashion, in order to rotate the moveable member (86.1). The skimming device (78) may be a pump such as a lobe pump, and the moveable member (86.1) may be a vane or a lobe of the rotary lobe pump. In the example embodiment, two lobes (86.1, 86.2) are provided, which are rotatable relative to one another by the driving arrangement (90). Other moveable members may be used and pumps with a single vane or lobe, or pumps with more than two vanes or lobes may also be used. It is also possible for other types of automatic skimming devices to be used to skim the upper surface or level of the body of liquid to remove product therefrom.

The discharge passage or outlet (24) may be provided in communication with the skimming device (78). The skimming device (78) may be arranged to cause the solid product (82) (such as carbon or other solid product) to be urged along the upwardly angled discharge passage (84), while also enabling the gas or fluid product (80) to escape through the outlet (24). Gas or fluid products may for example escape through an opening (81) between the vane or lobe (86.1) and the lid (42). The rotary lobes (86.1, 86.2) may be rotated and may operatively skim the surface (22) or level of the liquid to skim off the product (26) of the interaction between the liquid (16) and the injected or introduced feed fluid (20). Optionally, a separating device or separator (not shown) may be provided downstream of the outlet (24) to cool and separate the fluid product (80) and the solid product (82). The arrangement of the skimming device (78) and the upwardly angled discharge passage (84) may be configured such that the liquid (16) is enabled to flow back into the chamber (14) under the influence of gravity (e.g. through the opening (81)), for example if the liquid is inadvertently or otherwise moved into the upwardly angled discharge passage (84), thereby separating the liquid (16) from the product (26). Other embodiments may be possible wherein the outlet is a horizontal passage, or a downwardly angled passage for enabling the fluid product to be discharged from the outlet. When a downwardly angled or sloped passage is used, the skimming device (78) may be omitted. For example, if one of the products (26) is a liquid, and the other product is a gas, or when there is only a fluid product, then the product removing device (78) may be omitted and a second weir or siphon or downwardly sloped passage may be used to drain off the product from the chamber (14).

Hence, embodiments are possible wherein the outlet may be a second weir (not shown), which may be used to tap off liquid product at a different level from the interior of the chamber (14). In some embodiments, Hydrogen Sulphide gas $H_2S$ may be reformed by the reformer or furnace (10). Hydrogen Sulphide gas may be introduced into the fluid feed tube (48) and it may be reformed by the interaction with the liquid (16) (such as molten metal) and the product may include Hydrogen gas $H_2$ and Sulphur gas, or Sulphur liquid or solid Sulphur (depending on an operating temperature and layout of the furnace (10)). In the case of liquid Sulphur, the second weir may be used to discharge the liquid Sulphur. It is expected that liquid Sulphur may be discharged at between 115 to 445 degrees Celsius. Moreover, in the case of floating or buoyant product(s) (26), if one the products is a liquid product, then it may be drained or tapped from the liquid or molten metal surface (22) by siphoning or tapping the liquid off at the second weir, valve or gate. Liquid product may also be siphoned or tapped off at or near the location where the liquid (16) flows over the weir (30).

The liquid (16) may be a molten metal or a molten salt, however other liquids may be heated in the furnace (10) or reformer. In the case of molten metals, the metal used may be a metal alloy, or it may include one or more metallic elements selected from the group consisting of Bismuth, Tin, Silver, Mercury, Nickel, Platinum, Palladium, Iron, Copper, Zinc, Cobalt, Molybdenum and transition metal sulphides such as Molybdenum, Tungsten, Vanadium, Iron, Cobalt, Nickel, Copper and Zinc sulphides, or combinations of these. The fluid (20) or feed fluid that is introduced by the fluid feed tube (48) may be a feed gas or a feed liquid selected to interact with the molten metal, salt or liquid (16), as the case may be. The feed gas may be a sulphide-based gas and it may for example be Hydrogen Sulphide. If a feed liquid is used, the feed liquid may be a liquid selected from the group consisting of Sulphide containing oils and lubricants, carbon disulphide, dimethyl disulphide, and Diphenyl disulphide.

Figure 8:
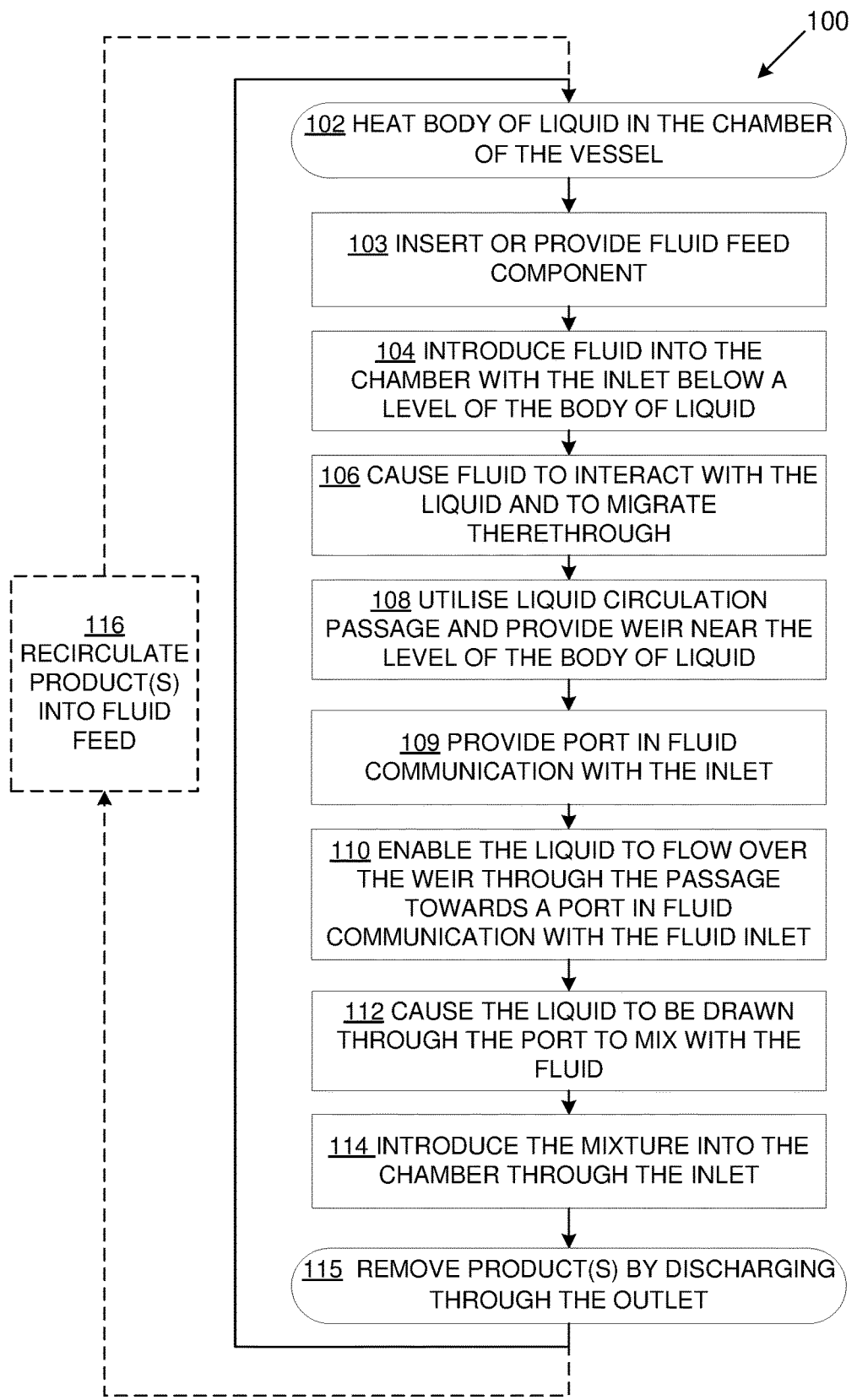
FIG. 8 is a high-level block diagram of an exemplary method of reforming a fluid.

In FIG. 8 is shown an example of a method (100) of reforming a fluid. The method may include heating (102) the body of liquid (16) in the chamber (14) of the vessel (12). The heating (102) may be introduced so as to create a heat gradient in the body of liquid (16). Once the material (such as metal) contained in the body of liquid (16) is in liquid phase, the fluid feed component (50) may be inserted (103) into the chamber (14), or it may be provided in the chamber in advance. The fluid (20) may be introduced (104) into the chamber (14) below the level (22) of the body of liquid (16) with the inlet (18). The fluid (20) may be caused (106) to interact with the liquid (16) and to migrate therethrough towards the outlet (24) for discharging a product (26) of the interaction from the chamber (16). The method (100) may include utilising (108) the liquid circulation passage (28) and providing or operatively locating the weir (30) near the level (22) of the body of liquid (16). The method may further include utilising or providing (109) the port (34), which is located remote from the weir (30), in fluid communication with the inlet (18). The liquid (16) may be enabled (110) to flow over the weir (30) through the liquid circulation passage (28) towards (and preferably through) the port (34) in fluid communication with the fluid inlet (18). The liquid (16) may be caused (112) to be drawn through the port (34) to mix with the fluid (20), and the mixture may be introduced (114) into the chamber (14) through the inlet (18). The product(s) (26) may be removed (115) by discharging through the outlet (24), optionally by utilising the product removing device (78). Optionally, the method (100) may also include recirculating (116) one or more of the products (26) into the fluid feed (for example, if one or more of the products are liquids or fluids). The present disclosure extends to a method of cleaning a surface of a body of liquid. The method may include providing a cleaning device (such as the product removing device (78)) to clean the surface of the body of liquid.

Optionally, the step (102) of heating the body of liquid (16) may include creating a heat gradient in the body of liquid. The method may also include heating a material, a metal or a salt in the vessel until the material, metal or salt becomes molten so as to form the body of liquid. The method may further include, once the material, metal or salt contained in the body of liquid is in a liquid phase, inserting the liquid circulation passage (28) (and/or the fluid feed component (50)) and submerging the lower end (56, 53) of the liquid circulation passage or fluid feed component below the level of the body of liquid such that the weir (30) is operatively located near the level (22) of the body of liquid.

The liquid level (22) may be controlled in order to skim the surface of the liquid (16) to remove particulates from the surface or level (22). The furnace or reformer (10) can be used for level control for any type of liquid or molten material, including molten metals and/or salts. The skimming may be performed automatically and during operation, and the vessel (12) need not be opened to remove the product(s) therefrom. This may provide advantages over known furnaces or reformers that the applicant is aware of. With known furnaces, the furnace needs to be opened to the atmosphere in order to manually rake or scrape the surface of the metal to remove floating material or items therefrom. The present disclosure may thus reduce downtime and it may be more efficient that prior art systems or methods that the applicant is aware of. It is also envisaged that the fluid feed component (50) may be retro-fitted to existing furnaces to enable liquid level control.

A combination of molten metals and salts may form part of the heated liquid (16). The furnace may also be referred to as a fluid reformer, or the furnace may be operable as a fluid reformer. The vessel (12) may be arranged to hold a molten material as the body of liquid in use. The combination or mixture may be heated and maintained at a temperature above the melting point of the mixture. The elevated or high temperature and catalytic effect of the molten metal or liquid (16) may cause the feed fluid (20) to decompose or break down into one or more of its constituent elements (as a result of the interaction between the feed fluid and the liquid (16)). In an exemplary embodiment, Methane ($CH_4$) may be used as feed gas (20), and a molten metal as the body of liquid (16). The constituent elements (which may form part of the product (26)) may for example include carbon (C), which may form solid graphite and/or graphene and/or carbon-fibre and/or carbon-black product (82) (this may be referred to as solid product(s)); and hydrogen gas ($H_2$), or fluid product (80). Since the density of the carbon products (82) is lower than that of the liquid metal (16), the carbon may rise to the surface or level (22) of the molten metal (16) and float thereon. Material (such as the solid graphite, fluid, froth, or other solid products (26)) that floats on the molten metal (16) may be referred to as "slag". However, throughout this specification the term "slag" should not be construed as only including waste material and references to "slag" may also include other products, because the floating substances or product(s) may be considered valuable. The hydrogen product gas ($H_2$) (80) may bubble to the surface of the molten metal and may be further processed and utilised. The removal of product or buoyant materials (liquids, solids or gases) (26) with the roots lobes or vanes (86.1, 86.2) (or another type of sweeping, scraping or other product removing device) may be performed by the furnace (10) or reformer.

Moreover, the furnace or reformer (10) may enable automatic control of the level (22) and/or may control the quantity of material inside the vessel (12). Surface skimming may be performed by the skimming device (78) continually (and/or automatically), and may thereby allow the continuous removal of gas, liquid or solid product (26) (including any items or slag formed on the surface of the liquid (16)). A closed or pressurised or inert or vacuum environment may be maintained inside the chamber (14) and/or inside the vessel (12). This environment may facilitate the removal of the product (26). The present disclosure may enable blanketing of the vessel (12) whereby the feed fluid (20) is applied in order to occupy an empty space inside the chamber (14).

The present disclosure may provide the advantage that the feed fluid (20) and/or the weir (60) may be used to automatically control the level (22) of the body of liquid (16) without the need for additional instrumentation, pumps or control equipment. The level (22) may be maintained or controlled by circulating the liquid (16) through the liquid circulation passage (28) and/or through the fluid acceleration device (58) (which may be referred to as a down-flow nozzle). It should be appreciated that the liquid circulation passage (28) need not be concentric with the fluid feed (48) and embodiments are possible wherein the liquid circulation passage may be spaced away from the fluid feed (48) along a portion of its length. In such an embodiment, the liquid (16) may be drawn or pulled from the liquid circulation passage (28) into the stream of the feed fluid (20) (even if the fluid acceleration device (58) is omitted). A pressure may be applied to the feed fluid (20) and this may cause the liquid (16) or molten metal to flow over the weir (30). The weir (30) may also be referred to as a gate or an overflow opening. Embodiments are also possible wherein the weir, gate or overflow opening may be opened, adjusted or closed from outside the furnace (10), for example by using a valve, or other opening device which can be operated from outside the furnace (10). The weir may be adjusted or set at a predefined height from the bottom (40) of the vessel (12) to control the height of the level (22).

The type of product (26) that may form on the surface or level (22) of the liquid (16) may depend on the type of feed fluid (20) used, as well as on the type of liquid (16), molten metal, salt or combination thereof used. The product removing device (78) may be arranged for continual removal of any floating particulates on the level (22) or surface. The solid product (82) may for example include fine particulates or larger lumps. In the present embodiment, product removal may be achieved by slightly submerging one or more of the lobes or vanes (86.1, 86.2) below the level (22) as is diagrammatically illustrated in FIG. 6. These vane(s) or lobe(s) (86.1, 86.2) may then be rotated or moved by the driving arrangement (90) and may act as a positive displacement mechanism to force or urge the floating material or solids in and onto the inclined or sloping or upwardly angled discharge passage (84) that may extend towards the outlet (24). The liquid (16) may thus be separated from the solid or fluid product(s) (26) by gravity, and the liquid (16) may flow back into the chamber (14). The product removing device (78) may thus be arranged or configured not to provide a perfectly fluid tight seal (e.g. because of the opening (81)), to enable the liquid (16) to flow back past the lobes or vanes (86.1, 86.2). Embodiments may be possible wherein the fluid product (80) such as gas is at least partially recirculated back into the fluid feed (48) in order to enhance the surface skimming ability of the present disclosure. The reformer (10) may also be referred to as a system (10) for reforming a fluid. A system for cleaning a surface of a body of liquid may also be provided, as the product removing device (78) or cleaning device may be used to clean the surface or level (22) of the liquid (16). Inside the chamber (14), a roof (15) of the chamber (14) may be angled, sloped or curved. In the present embodiment, the roof is dome-shaped. The shape of the roof (15) may be configured to enable the product to migrate towards the outlet (26) (and towards the product removing device (78) if it is used). Rotation of the vanes or lobes (86.1, 86.2) in conjunction with a flow of gas product (80) (if a gas product is produced) may sweep the product(s) from the liquid surface (22) and into the angled discharge passage (84) and towards the outlet (24).

The product removing device (78) or skimming device may have two roots lobes or vanes (86.1, 86.2). However, instead of using these roots lobes or vanes (86.1, 86.2), the product (26) can also be driven or displaced by many other conventional means known in the industry. For example, multi-lobe, gear type, vane type other any other mechanical means of pumping, stirring, scraping, shimming, skimming, cleaning, or wiping the surface (22) of the liquid (16) may be used. In the case of the solid product (82) including particulates or fine particulates, these particulates may even be removed by only blowing or recirculating gas or product gas across the liquid surface, or by evacuating the surface by any other means. The fluid product (80) may also be evacuated or removed by blowing or applying pressure. A plurality of skimming devices may also be used in a number of stages, levels or layers. For example, an upper layer may be skimmed by a first skimming device and a lower level may be skimmed by a second skimming device. Any number of skimming devices may be used. This may be referred to as multi-layered skimming, and material may be removed from the chamber at a level which is lower than the upper surface of the body of liquid.

The disclosed embodiments may provide the advantage that circulation of the liquid (16) (such as molten metal) through the inflow of the feed fluid (20) through the fluid acceleration device (58) may cause the feed fluid (20) to be efficiently mixed or diluted into the liquid (16), thereby creating bubbles such as micro and nano-scale bubbles. These micro or nano-scale bubbles may enhance contact and reaction time between the feed fluid (20) and the liquid (16). The disclosed embodiments may also provide the advantage that the liquid (16) may remain substantially inside the vessel (12) and a secondary inventory or heating vessel may not be needed as is the case with known systems that the applicant is aware of. This may enable efficient energy integration and effective use of excess or waste heat. Heat losses may also be reduced, by way of the insulative material (74) used in the vessel (12) and because the liquid may remain inside the chamber (14) during the reforming process. The vessel (12) may provide a single vessel which may be heated and/or temperature controlled with the electric induction coil(s) or heating element (46). Power supplied to the heating element (46) may be generated by, or based on renewable energy sources or efficient energy sources to enable reformation of the fluid (such as the hydrocarbon-based fluid) without producing unwanted carbon emissions, or the amount of carbon emissions may be reduced or limited by the disclosed embodiments. For example, if hydro, solar or wind energy is used to power the heating element, this disclosure may provide for the production of the product (such as Hydrogen) without producing significant carbon emissions. It is also envisaged that the feed gas may be a hydrocarbon-based gas and it may for example be selected from the group consisting of methane, propane, ethane, butane etc.

In the case of the liquid (16) being molten metal, a combination of solid, foamy, froth-like or liquid slag on the surface of the molten metal may be formed. This slag may interfere and/or may have an adverse effect on the quality of any products intended to be produced by the furnace. The disclosed embodiments may facilitate proper or effective, and timeous removal of any floating substances (including slag) from the surface of the liquid (16). This may enable products which would normally have become waste material to be utilised as valuable products and/or the quality of intended products produced may be improved by removing material from the surface of the liquid. A layer of slag or material may automatically and continuously be removed from the surface or level (22) of the liquid (16), to prevent extended contact between the material and the gas or fluid product (80) produced in the reformer or furnace (10). This timeous or efficient removal of the products (26) (or other removed material) may alleviate unwanted reactions or formation of unwanted by-products.

The heating element (46) can be used to vary the temperature of the liquid (16), salt or molten metal. This may cause the level (22) to fluctuate as the liquid (16) expands or contracts as result of the changing heat. The level (22) can be controlled by overflowing the weir (30). The operating temperature, the type of liquid or molten metal and the level (22) may thus be controlled or predefined by the location of the weir (30). Introducing the feed fluid may also affect the level (22) and the amount of feed fluid (20) introduced may also be varied to control the level (22) (e.g. in conjunction with the weir (30)). In the case of the feed fluid (20) being a gas, variable gas hold-up in the molten metal or liquid (16) may cause the density and volume (and therefore liquid level (22)) to change in the furnace or reactor (10). The present disclosure may thus enable liquid level control which may be performed actively, or proactively in conjunction with the weir (30). In other words, the liquid level (22) may be preconfigured to provide an efficient reforming process. It will be appreciated that the aforesaid level control may provide advantages over currently known furnaces or reformers, because the level (22) may be accurately controlled. The accurate control of the level (22) may enable the constant, or automatic, and/or effective removal of slag, material, or product(s) from the constantly managed level (22) or surface of the liquid (16). The removal of the product(s) (26) may also facilitate control of the level (22) and control of the volume occupied by the liquid (16) inside the chamber (14). The level (22) may also be kept constant (and it may for example be kept at the height of the weir from the bottom) by the circulation of the liquid through the passage (28).

In the case of the furnace (10) being used to heat or smelt metal, high temperatures in the chamber may be required (for example, temperatures in excess of about 1000° C.). These high temperatures may present challenges in terms of materials and mechanical operation. However, the present disclosure may enable automatic control of the level of the liquid without requiring mechanical intervention or complex instrumentation. The liquid metal (or other liquid) may be agitated by the introduction of the feed fluid (20) as described above. This agitation may be performed without mechanical intervention inside the chamber (14). The furnace or reformer (10) may provide a system for introducing the feed fluid (20) below the level (22) of the liquid and may provide circulation of the liquid (16) to facilitate the reforming process. The system may be referred to as a closed system or a substantially closed system, or a sealed system, or a pressurised system. In the case of a feed gas, diffusion of the feed gas into the hot liquid (12) may be caused. Heat integration may also be achieved between the feed gas and the products or product streams and the furnace or reactor (10). Heat may be transferred from the heated liquid to the mixture (36) (including the circulated liquid), and heat may also be transferred to the feed fluid. The feed fluid may also include a cooling fluid. The cooling fluid may be introduced into the chamber with the feed fluid, or a separate cooling fluid feed may be provided for introducing the cooling fluid at another location. Embodiments are also possible wherein a plurality of fluid feeds are provided, or wherein a plurality of fluid feed components may be provided for discharging the feed fluid, or a plurality of different kinds of feed fluids, into different regions inside the chamber (14).

It will be appreciated that, even though the outlet (24) is depicted (e.g. in FIG. 2) as being near the top (38) of the furnace (10), embodiments are possible wherein the outlet may be provided near the bottom (40) of the furnace. In such an embodiment, the product(s) may for example have a higher density than the liquid (16) and may sink towards the bottom. The product removing device may then be provided near the bottom. In such an embodiment, the inlet may still be provided below the level (22), but further away from the bottom, for example in a middle region of the body of liquid or even near the top (38). The weir or equivalent device such as a gate or opening may then also be provided near the bottom, and liquid may then be conveyed from the gate upwards to be mixed with the feed fluid (20) nearer to the top (38). It is envisaged that in such an embodiment, the fluid acceleration device (58) may be provided near the top. It will further be appreciated that with the present disclosure, a separate oxidizing or conventional combustion heated or arc furnace pot or buffer tank for heating the liquid need not be used. This is because the heating element (for example using induction heating) may heat the liquid inside the furnace (10) and the furnace (10) may also be used as a reformer for treating the feed fluid or causing the feed fluid to react with the heated liquid. Tank blanketing or tank padding may be performed to the vessel or tank, by introducing the feed fluid or feed gas to occupy an otherwise empty space in the chamber, and in order to allow the level of the liquid to be controlled.

The foregoing description has been presented for the purpose of illustration; it is not intended to be exhaustive or to limit the invention to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A furnace comprising:
   a vessel that defines a chamber therein for holding a body of liquid;
   a fluid inlet for introducing a fluid into the chamber below an intended level of the body of liquid to cause the fluid to interact with the liquid and to migrate therethrough towards an outlet for discharging a product of the interaction from the chamber; and
   a liquid circulation passage having a weir which is operatively located at a predefined vertical height from a bottom of the furnace so as to form the intended level of the body of liquid, and a port which is located remote from the weir and in fluid communication with the fluid inlet so as to enable the liquid to flow over the weir through the liquid circulation passage and through the port,
   wherein the furnace is operable as a fluid reformer and arranged to cause the fluid to break down into one or more of its constituent elements.

2. The furnace as claimed in claim 1, wherein the port is configured to draw the liquid therethrough to mix with the fluid, so that the mixture is introduced into the chamber through the fluid inlet.

3. The furnace as claimed in claim 2, wherein the mixture is caused to migrate through the liquid, and wherein the weir is operatively located at the intended level of the body of liquid to control the level of the body of liquid as the liquid flows over the weir.

4. The furnace as claimed in claim 1, wherein the furnace includes a product removing device arranged to separate the product from the liquid.

5. The furnace as claimed in claim 4, wherein the product removing device is a skimming device for skimming a surface of the body of liquid in the chamber.

6. The furnace as claimed in claim 5, wherein the skimming device includes a moveable member that automatically skims the surface of the body of liquid to separate the product therefrom, and wherein a driving arrangement is provided to drive the moveable member of the skimming device.

7. The furnace as claimed in claim 4, wherein the product removing device is in communication with the outlet to discharge the product from the outlet.

8. The furnace as claimed in claim 4, wherein the product includes a fluid product and a solid product, and wherein the outlet is arranged to discharge one or both of the fluid product and the solid product.

9. The furnace as claimed in claim 8, wherein the outlet is an upwardly angled discharge passage in communication with the product removing device, wherein the product removing device is arranged to cause the solid product to be urged along the upwardly angled discharge passage, while enabling the fluid product to escape, and wherein the product removing device and the upwardly angled discharge passage are arranged such that the liquid is enabled to flow back into the chamber under the influence of gravity, if the liquid is inadvertently moved into the upwardly angled discharge passage, thereby separating the liquid from the solid product.

10. The furnace as claimed in claim 5, wherein the product removing device is a pump, and wherein the pump includes a plurality of vanes or lobes arranged to separate the product from the liquid.

11. The furnace as claimed in claim 1, wherein a fluid acceleration device is provided at the fluid inlet for accelerating the fluid therethrough, with the fluid acceleration device in fluid communication with the port of the liquid circulation passage.

12. The furnace as claimed in claim 11, wherein the fluid acceleration device is any one of a venturi, a nozzle, an aspirator, an eductor, an ejector, or a jet pump.

13. The furnace as claimed in claim 11 wherein the fluid acceleration device is configured to cause the fluid to mix with the liquid to form bubbles.

14. The furnace as claimed in claim 1, wherein the vessel is arranged to hold a molten material as the body of liquid.

15. The furnace as claimed in claim 14, wherein the molten material is a molten metal or a molten salt.

16. The furnace as claimed in claim 15, wherein the furnace includes a fluid feed tube in fluid communication with the inlet for introducing the fluid into the chamber.

17. The furnace as claimed in claim 16, wherein the fluid that is introduced by the fluid feed tube is a feed gas or a feed liquid selected to interact with the molten metal or molten salt.

18. A fluid feed component comprising:
an upper end arranged to be fixed to a vessel for holding a body of liquid;
a lower end arranged to be provided below an intended level of the body of liquid in the vessel;
a fluid inlet at the lower end, for introducing a fluid into the vessel below the level of the body of liquid in the vessel so as to cause the fluid to interact with the liquid and to migrate therethrough; and
a liquid circulation passage extending from the upper end towards the lower end, having a weir which is operatively locatable at a predefined vertical height from a bottom of the vessel so as to form the intended level of the body of liquid, and a port which is located remote from the weir and in fluid communication with the fluid inlet so as to enable the liquid to flow over the weir through the liquid circulation passage and through the port,
wherein the fluid feed component is operable as a fluid reforming component and arranged to cause the fluid to break down into one or more of its constituent elements.

* * * * *